United States Patent [19]
DeKelaita

[11] Patent Number: 5,551,116
[45] Date of Patent: Sep. 3, 1996

[54] DEVICE TO REFRESH WIPERS IN USE

[76] Inventor: Nergal DeKelaita, 235 Mayer Ave., Wheeling, Ill. 60090

[21] Appl. No.: 567,132

[22] Filed: Dec. 4, 1995

Related U.S. Application Data

[63] Continuation of Ser. No. 338,944, Nov. 14, 1994, abandoned.

[51] Int. Cl.$^6$ .................................. B60S 1/44; B60S 1/32
[52] U.S. Cl. .................. 15/250.19; 15/246; 15/250.21
[58] Field of Search .................... 15/250.19, 250.16, 15/250.17, 250.351, 246, 250.202, 250.21, 250.23, 250.001, 250.352

[56] References Cited

U.S. PATENT DOCUMENTS

| | | | |
|---|---|---|---|
| 2,306,980 | 12/1942 | Roberts | 15/255 |
| 2,717,408 | 9/1955 | Le Page | 15/250.19 |
| 2,784,438 | 3/1957 | Petersen | 15/250.19 |
| 2,974,340 | 3/1961 | Kopczynski | 15/250 |
| 3,908,222 | 9/1975 | Scott | 15/250 |
| 4,378,484 | 2/1983 | Kanert | 219/203 |
| 4,685,168 | 8/1987 | Mastromoro | 15/250 R |
| 4,866,811 | 9/1989 | Kühbauch | 15/250.19 |
| 5,469,595 | 11/1995 | Dara | 15/250.19 |
| 5,487,204 | 1/1996 | Nelson | 15/250.19 |

FOREIGN PATENT DOCUMENTS

| | | | |
|---|---|---|---|
| 3731921 | 12/1988 | Germany | 15/250.34 |
| 4235395 | 4/1994 | Germany | 15/250.19 |
| 5795234 | 6/1982 | Japan . | |
| 5863551 | 4/1983 | Japan . | |
| 5918349 | 4/1984 | Japan . | |
| 5940060 | 9/1985 | Japan . | |
| 85150 | 3/1992 | Japan | 15/250.19 |
| 162616 | 6/1993 | Japan | 15/250.19 |

Primary Examiner—Gary K. Graham
Attorney, Agent, or Firm—Don Moyer

[57] ABSTRACT

A ramp rotatably attached to a base attached to a vehicle windshield has an inactive state in which a wear block attached to the arm which carries the wiper over the windshield passes over the ramp without touching the ramp. The ramp also has an active state in which the wear block rides up the ramp whereby the wiper is lifted off of the windshield so that the arm then returns the wiper to the windshield with a jolt causing debris to leave the wiper. A remotely locatable electromagnetic solenoid actuates the ramp into the active state and frees the ramp to be returned to the inactive state by a return spring. The solenoid is controllable from within the vehicle.

7 Claims, 1 Drawing Sheet

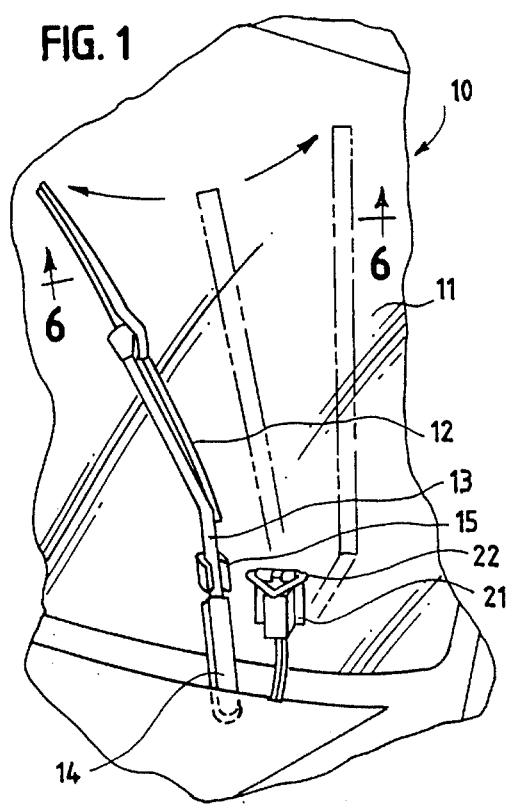
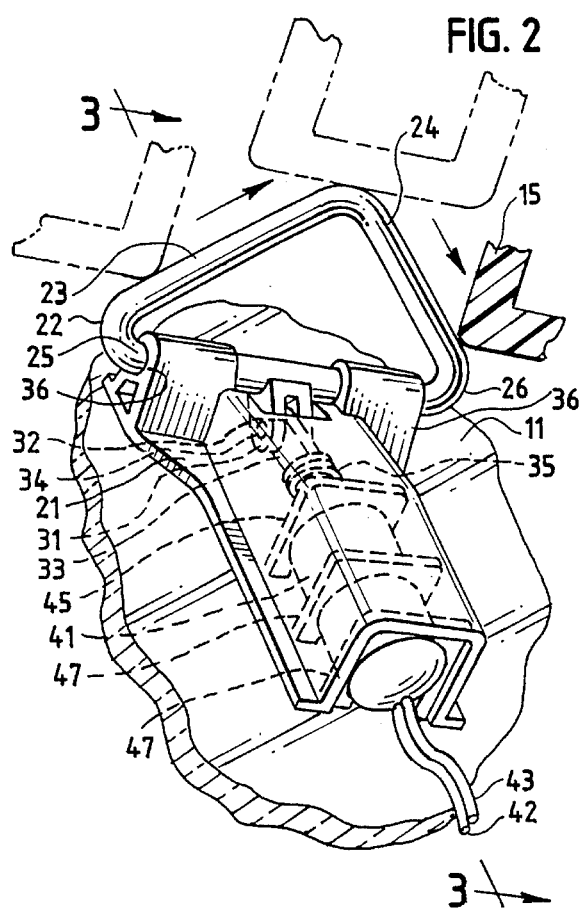
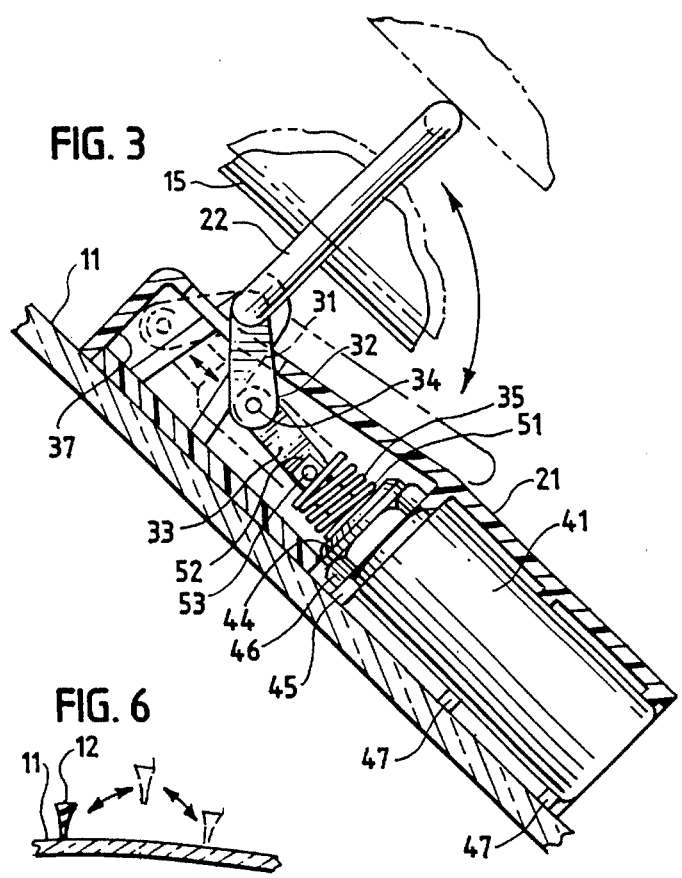
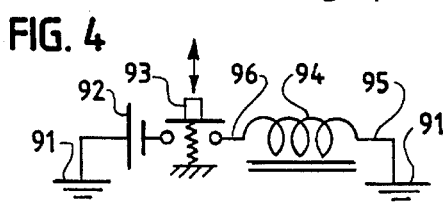
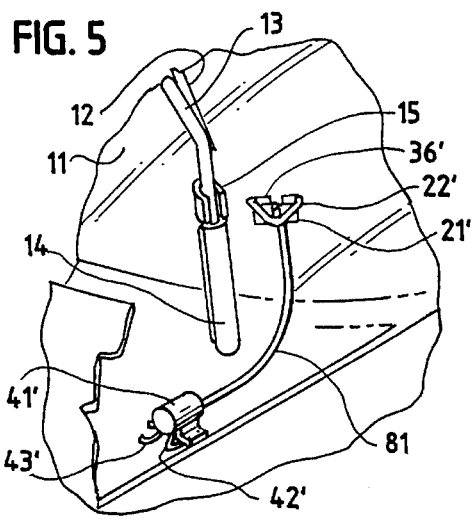

ns in use.

DEVICE TO REFRESH WIPERS IN USE

BACKGROUND OF THE INVENTION

This application is continuation-in-part of U.S. application Ser. No. 08/338,944 for "Apparatus and Method for Clearing Debris from Windshield Wiper Blades" filed Nov. 14, 1994, now abandoned.

This invention relates to a wiper which is moved across a surface to wipe the surface and specifically to a device which can refresh the wiper by jolting the wiper to cause debris to leave the wiper while the wiper is in use.

Well known problems can arise when debris accumulates on a wiper wiping a surface such as a vehicle window. In winter, when snow and freezing water accumulate on a wiper, then the efficiency of the wiper for wiping the vehicle window becomes dangerously low. Similarly, other debris, such as mud, oil, insects, twigs, leaves, and the like, can seriously lower the wiping efficiency. On a clear summer day, attempts to use the wiper to wipe insects from a vehicle window can greatly reduce vision when oil which has accumulated on the wiper smears the window.

The need to refresh the wiper is addressed in Kopczynski's U.S. Pat. No. 2,974,340; Scott's U.S. Pat. No. 3,908,222; Kunert's U.S. Pat. No. 4,378,484; and Mastromoro's U.S. Pat. No. 4,685,168. All these devices propose means for scraping to be attached to a vehicle window so that when the wiper passes over the scraper debris is scraped from the wiper. In U.S. Pat. No. 2,306,980 Roberts proposes a spring loaded device, which in one stroke of the wiper raises the wiper off the surface and allows the wiper to return to the surface to jar debris off the wiper, and which is pushed aside by the wiper's return stroke. The device lifts the wiper on each pass of the wiper unless it is locked aside manually. This device could be disabled easily by debris thereby disabling the wiper. Also, this device is not adapted to remote actuation nor adapted to remote control.

Several Japanese patent documents—Satou's JP 57-95234, Gotou's JP 58-63551, Sendu's JP 60-185658, and Shikeda's JP 61-60354— and Kuhbauch's U.S. Pat. No. 4,866,811 all propose devices which raise and lower a wiper relative to the wiped surface. These devices are intended to reduce the wear on the wiper by lifting the wiper when the wiper is not in use and are not adapted to the larger forces needed to refresh the wiper in use. Thus, there is an opportunity for a product which can refresh a wiper in use, which can be remotely actuated, and which can be remotely controlled.

SUMMARY OF THE INVENTION

Objects of this invention include the following. Make a device which can lift a wiper above the wiped surface so that the wiper will return to the surface with a jolt causing compression and shear strains of the wiper which weaken bonds holding debris on the wiper so that the inertia of debris will carry the debris from the wiper, thus refreshing the wiper. Make a wiper refreshing device which can refresh a wiper in use. Make a wiper refreshing device which can be remotely actuated. Make a wiper refreshing device which can be remotely controlled. Make a wiper refreshing device which produces minimum interference with existing, standard mechanisms which move a wiper across the wiped surface. Make a wiper refreshing device which will not be disabled by debris normally encountered by the wiper. Make a wiper refreshing device which is easy to install and easy to use. Make a wiper refreshing device which is easy to manufacture. Make a wiper refreshing device which has low cost.

In Summary, one embodiment of this invention comprises means for lifting a wiper off of a surface being wiped so that the wiper will return to the surface with a jolt causing debris to leave the wiper, remotely locatable means for actuating the lifting means, means for linking the actuating means to the lifting means, and remotely locatable means for controlling the actuating means. Other equivalent embodiments will be comprehended in the detailed description of the drawings, which will make additional equivalent embodiments obvious to people skilled in the art.

DRAWING FIGURES

FIG. 1 shows a new wiper refreshing device in use on a vehicle windshield.

FIG. 2 shows a perspective view of means for lifting a wiper.

FIG. 3 shows a side view of means for lifting a wiper.

FIG. 4 shows a schematic of means for controlling the new wiper refreshing device.

FIG. 5 shows an alternative and equivalent embodiment of the new wiper refreshing device, with a remotely located actuating means, in use on a vehicle windshield.

FIG. 6 shows the path of a wiper being refreshed.

DETAILED DESCRIPTION OF THE DRAWINGS

A new wiper refreshing device 10 is shown in use on a vehicle windshield 11 in FIG. 1. A wear block 15 is fastened onto the arm 13 which carries the wiper 12 across the windshield. At 14 the arm 13 is attached to an existing, standard vehicle wiper mechanism, which, being well known, is not shown. The existing, standard vehicle wiper mechanism moves the arm, and thus the wiper, across the window and also biases the arm 13 to keep the wiper in contact with the surface being wiped.

A ramp 22 is rotatably attached to a base 21 which is attached onto the surface being wiped 11. The ramp has an inactive state in which the wear block does not contact the ramp as the arm moves across the surface being wiped. The ramp also has an active state in which the wear block rides up the ramp thereby lifting the wiper off of the surface being wiped. The wiper is then returned to the surface by the bias of the arm moving the wiper. The wiper returns to the surface with a jolt causing compression and shear strains of the wiper which weaken bonds holding debris on the wiper so that the inertia of the debris caries the debris off the wiper, thus refreshing the wiper.

In FIG. 2 the ramp is shown in its active state, and the wear block 15 is shown on the ramp left side 23 and on the ramp left side 24. The wear block, and thus the wiper arm, can ride up the ramp from the left and from the right. The existing, standard mechanism which moves the arm 13, will move the arm up the ramp thereby lifting the wiper off of the windshield. After the wear block 15 passes the apex of the ramp the mechanism moving the arm carries the wear block beyond the ramp and returns the wiper to the windshield providing the jolt which removes debris and refreshes the wiper. This net path of the wiper is indicated in FIG. 6. The ramp bottom left 25 and the ramp bottom right 26 are rotatably attached to the base 21 at the ramp base connections 36, which can be seen best in FIG. 2 and FIG. 3. The ramp is moved into the active state by the core 51 of an electromagnetic solenoid 41, which, when powered, pulls a link 33, which pulls the ramp lever arm 31. The link 33 is rotatably attached by a pin 34 to a yoke 32 on the ramp lever arm, and the link is also rotatably attached by a pin 53 to a yoke 52 on the solenoid core. The solenoid has a threaded end 44 which has a diameter less than the solenoid diameter and which passes through an aperture in a base rib 45 to which it is fastened by a nut 46 threaded onto the solenoid threaded end 44. The solenoid also passes through two other base ribs 47 which help position the solenoid.

The solenoid has a first electrical lead 42 which is connected to electrical ground and has a second electrical lead 43 which is connected to an electrical power source. FIG. 4 schematically shows the electrical connections whereby a 12 volt DC electrical power source 92 is connected to electrical ground 91 and is connected to a push button switch 93 which is normally open unless pushed to be connected to the second solenoid coil lead 96 (equivalent to 43') while the first solenoid coil lead 95 (equivalent to 42) is connected to electrical ground 91.

When the push button switch is closed and the solenoid is powered, the solenoid core is pulled into the solenoid and compresses a return spring 35 which is held between the nut 46 and the pin 53. When the push button switch is open and the solenoid is not powered, the solenoid core is freed to move outward from the solenoid allowing the return spring to push the link 53, which pulls the solenoid core out of the solenoid and pushes the ramp lever arm 31 against a stop 37, so that the ramp is moved to the inactive state in which the wear block passes without touching the ramp. The push button is remotely located in the vehicle and can be activated by a person sensing that the wiper needs to be refreshed. The person using the wiper refreshing device can close the push button switch as the wiper arm approaches the ramp from the left and alternatively as the arm approaches the ramp from the right. The push button switch can be held closed so that the wiper is jolted each time the arm passes the ramp. The person using the device senses the need and the timing to change the ramp from the inactive state to the active state and from the active state to the inactive state. In other equivalent embodiments sensors and timing circuits can detect the need and timing to activate and inactivate the device.

In an alternative and equivalent embodiment, shown in FIG. 5, the solenoid 41' can be attached to a vehicle at a location remote from the base 21' and the ramp 22'. Here a linkage 81 connects the solenoid to the ramp. The linkage 81 is a cable which functions as an extension of the link between the ramp lever arm and the solenoid core. The remote solenoid 41' has a first electrical lead 42' (equivalent to 42) which is connected to electrical ground and a second electrical lead 43' (equivalent to 43) which is connected to the remote push button switch equivalently to the scheme shown in FIG. 4. The end of the linkage 81 which is attached to the solenoid core in FIG. 5 could alternatively be attached to a knob, lever, or the like, which, being well known, am not shown, located inside the vehicle so that the ramp could be actuated manually to change from the inactive state to the active state.

Other means for lifting a wiper off of a surface being wiped equivalent to the ramp, with an inactive state and an active state, will be obvious to people skilled in the art. An equivalent lifting means could be attached to the arm which moves the wiper. This can include an arm, a cam, and a piston. In this case the controlling means could stop the arm moving the wiper while the wiper is being lifted off of the surface. Other means for actuating the lifting means equivalent to the solenoid also will be obvious to people skilled in the art. These can include motors, hydraulic, and pneumatic means, and can include manual means operated from a remote location by a person using the device. Equivalent actuating means can be located proximately or remotely. Other means for linking a remotely located actuating means to the lifting means such as a push cable, hydraulic lines, and pneumatic lines will be obvious to people skilled in the art. Other means for controlling the actuating means such as other electrical systems, fluidic systems, and manually operated mechanical systems will also be obvious to people skilled in the art. Other equivalent controlling means can be partly or fully sensor activated. It is understood therefore that this invention is not limited to the particular examples illustrated here.

I claim:

1. In a wiper system having a surface, a wiper which can wipe a portion of the surface, and a wiper arm which is driven to carry the wiper across the portion of the surface being wiped and which is biased to exert a force keeping the wiper in contact with the portion of the surface being wiped, a new wiper refreshing device comprising:

a base attached to the surface being wiped outside of the portion of the surface being wiped;

a ramp being pivotaly attached to the base, the ramp having an inactive state in which the ramp is pivoted so that the wiper arm passes over the ramp without contacting the ramp and the ramp having an active state in which the ramp is pivoted so that the wiper arm rides up the ramp lifting the wiper off of the surface so that after the wiper is lifted off of the surface the force exerted by the wiper arm returns the wiper to the surface with a jolt causing compression and shear strains of the wiper to weaken bonds holding debris on the wiper;

means for actuating the ramp, the actuating means for causing the ramp to pivot from the inactive state to the active state and for causing the ramp to pivot from the active state to the inactive state;

means for linking the actuating means to the ramp; and means for remotely controlling the actuating means, the controlling means for causing the actuating means to pivot the ramp from the inactive state to the active state and for causing the actuating means to pivot the ramp from the active state to the inactive state.

2. The mechanism of claim 1 further comprising a wear block attached to the wiper arm, the wear block for riding up the ramp when the ramp is in the active state so that the wiper is lifted off of the surface.

3. The mechanism of claim 1 wherein the ramp has a left side and a right side so that the wiper arm can ride up the ramp on the ramp left side and can ride up the ramp on the ramp right side.

4. The mechanism of claim 1 wherein the actuating means is remotely locatable.

5. The mechanism of claim 1 wherein the actuating means is an electromagnetic solenoid.

6. The mechanism claim 5 wherein the controlling means is a remotely located push button which electrically connects the solenoid to an electric power source.

7. In a wiper system having a surface, a wiper which can wipe a portion of the surface, and a wiper arm which is driven to carry the wiper across the portion of the surface being wiped and which is biased to exert a force keeping the wiper in contact with the portion of the surface being wiped, a new wiper refreshing device comprising:

a base attached to the surface outside of the portion of the surface being wiped;

a ramp being pivotaly attached to the base, the ramp having an inactive state in which the ramp is pivoted so that the wiper arm passes over the ramp without contacting the ramp and the ramp having an active state in which the ramp is pivoted so that the wiper arm rides up the ramp lifting the wiper off of the surface so that after the wiper is lifted off of the surface the force exerted by the wiper arm returns the wiper to the surface with a jolt causing compression and shear strains of the wiper to weaken bonds holding debris on the wiper;

remotely locatable actuating means for manually actuating the ramp, the actuating means for causing the ramp to pivot from the inactive state to the active state and for causing the ramp to pivot from the active state to the inactive state; and means for linking the actuating means to the ramp.

* * * * *